(12) United States Patent
Youngers

(10) Patent No.: US 10,046,399 B2
(45) Date of Patent: Aug. 14, 2018

(54) LATHE TOOL MOUNTING EXPANDER

(71) Applicant: James J. Youngers, Viola, KS (US)

(72) Inventor: James J. Youngers, Viola, KS (US)

( * ) Notice: Subject to any disclaimer, the term of this patent is extended or adjusted under 35 U.S.C. 154(b) by 0 days.

(21) Appl. No.: 14/887,010

(22) Filed: Oct. 19, 2015

(65) Prior Publication Data

US 2016/0039011 A1    Feb. 11, 2016

(51) Int. Cl.
| | |
|---|---|
| B23Q 1/03 | (2006.01) |
| B23Q 3/06 | (2006.01) |
| B25B 1/00 | (2006.01) |
| B23B 29/24 | (2006.01) |
| B25B 1/24 | (2006.01) |
| B23Q 3/00 | (2006.01) |
| B23B 31/117 | (2006.01) |
| B23Q 3/08 | (2006.01) |

(52) U.S. Cl.
CPC ......... *B23B 29/242* (2013.01); *B23B 31/1172* (2013.01); *B23B 2270/025* (2013.01); *B23B 2270/08* (2013.01); *B23Q 1/03* (2013.01); *B23Q 1/035* (2013.01); *B23Q 3/00* (2013.01); *B23Q 3/06* (2013.01); *B23Q 3/082* (2013.01); *B25B 1/00* (2013.01); *B25B 1/24* (2013.01)

(58) Field of Classification Search
CPC ... B23B 29/242; B23B 29/244; B23B 29/246; B23B 29/34; B23B 31/1172; B23B 31/16287; B23B 31/30; B23B 5/061; Y10T 82/2508; Y10T 82/2506; Y10T 82/2587
USPC ....... 279/4.1, 4.11, 4.12, 2.07, 2.09; 269/25, 269/26, 32
See application file for complete search history.

(56) References Cited

U.S. PATENT DOCUMENTS

| | | | | |
|---|---|---|---|---|
| 419,885 A * | 1/1890 | Richards | ............... | B25B 1/2421 |
| | | | | 269/157 |
| 1,453,176 A * | 4/1923 | Perrine | ................. | B23Q 1/035 |
| | | | | 269/266 |
| 2,394,624 A * | 2/1946 | Matchett | ............... | B23B 31/025 |
| | | | | 279/136 |
| 2,882,771 A * | 4/1959 | Blazek | ................. | B25B 1/2421 |
| | | | | 269/251 |

(Continued)

FOREIGN PATENT DOCUMENTS

| | | | | |
|---|---|---|---|---|
| DE | 2831660 A1 * | 3/1979 | ............. | B23B 31/00 |
| EP | 0065659 A1 * | 12/1982 | ........... | B23B 29/046 |

*Primary Examiner* — Ryan Rufo
(74) *Attorney, Agent, or Firm* — Kenneth H. Jack; Davis & Jack, L.L.C.

(57) ABSTRACT

A hydraulic fluid actuated lathe tool mounting expander assembly incorporating a block having a base, an inner end, an outer end, a compression end, and a compression face; a first cylindrical void extending into the block, the first cylindrical void having a floor and opening at the block's compression face; a second cylindrical void extending into the block, the second cylindrical void having a floor and opening at the block's outer end; first and second pistons respectively slidably mounted within the first and second cylindrical voids; a conduit extending between the first and second cylindrical voids, the conduit being adapted for conveying the hydraulic fluid from the second cylindrical void to the first cylindrical void; and a jack screw actuator connected operatively to the block for driving the second piston against the hydraulic fluid for upwardly driving the first piston.

17 Claims, 8 Drawing Sheets

(56) References Cited

U.S. PATENT DOCUMENTS

| | | | | |
|---|---|---|---|---|
| 3,095,190 A * | 6/1963 | Freund | ............... | B25B 1/18 100/270 |
| 3,211,445 A * | 10/1965 | Rossman | ............... | B23Q 3/066 269/157 |
| 3,868,102 A * | 2/1975 | Pevar | ............... | B25B 1/2421 269/26 |
| 4,284,267 A * | 8/1981 | Marben | ............... | B25B 1/2421 269/266 |
| 4,381,858 A * | 5/1983 | Riche | ............... | B23B 47/28 269/224 |
| 5,201,178 A * | 4/1993 | Rosemann | ............... | B25B 1/106 269/32 |
| 5,392,502 A * | 2/1995 | Freer | ............... | G05B 19/425 29/52 |
| 5,984,293 A * | 11/1999 | Abrahamson | ............... | B23Q 1/035 269/236 |
| 6,711,797 B1 * | 3/2004 | Bennett | ............... | B41F 15/18 269/20 |
| 6,725,750 B1 * | 4/2004 | Feltch | ............... | B23B 29/242 29/36 |
| 6,726,195 B1 * | 4/2004 | Hertz | ............... | B23Q 1/035 269/266 |
| 6,783,123 B2 * | 8/2004 | Guimont | ............... | B25B 1/2405 269/226 |
| 6,799,757 B1 * | 10/2004 | Lang | ............... | B25B 1/2463 269/266 |
| 6,898,837 B1 * | 5/2005 | Bennett | ............... | B41F 15/18 29/281.6 |
| 7,125,010 B2 * | 10/2006 | Moore | ............... | B23Q 1/035 269/266 |
| 9,138,841 B2 * | 9/2015 | Moncavage | ............... | B23Q 1/035 |
| 2006/0151930 A1 * | 7/2006 | Moncavage | ............... | B23Q 1/035 269/266 |
| 2007/0033786 A1 * | 2/2007 | Bradley | ............... | B23B 29/242 29/27 C |
| 2007/0090611 A1 * | 4/2007 | Soroka | ............... | B23B 31/16287 279/4.12 |

* cited by examiner

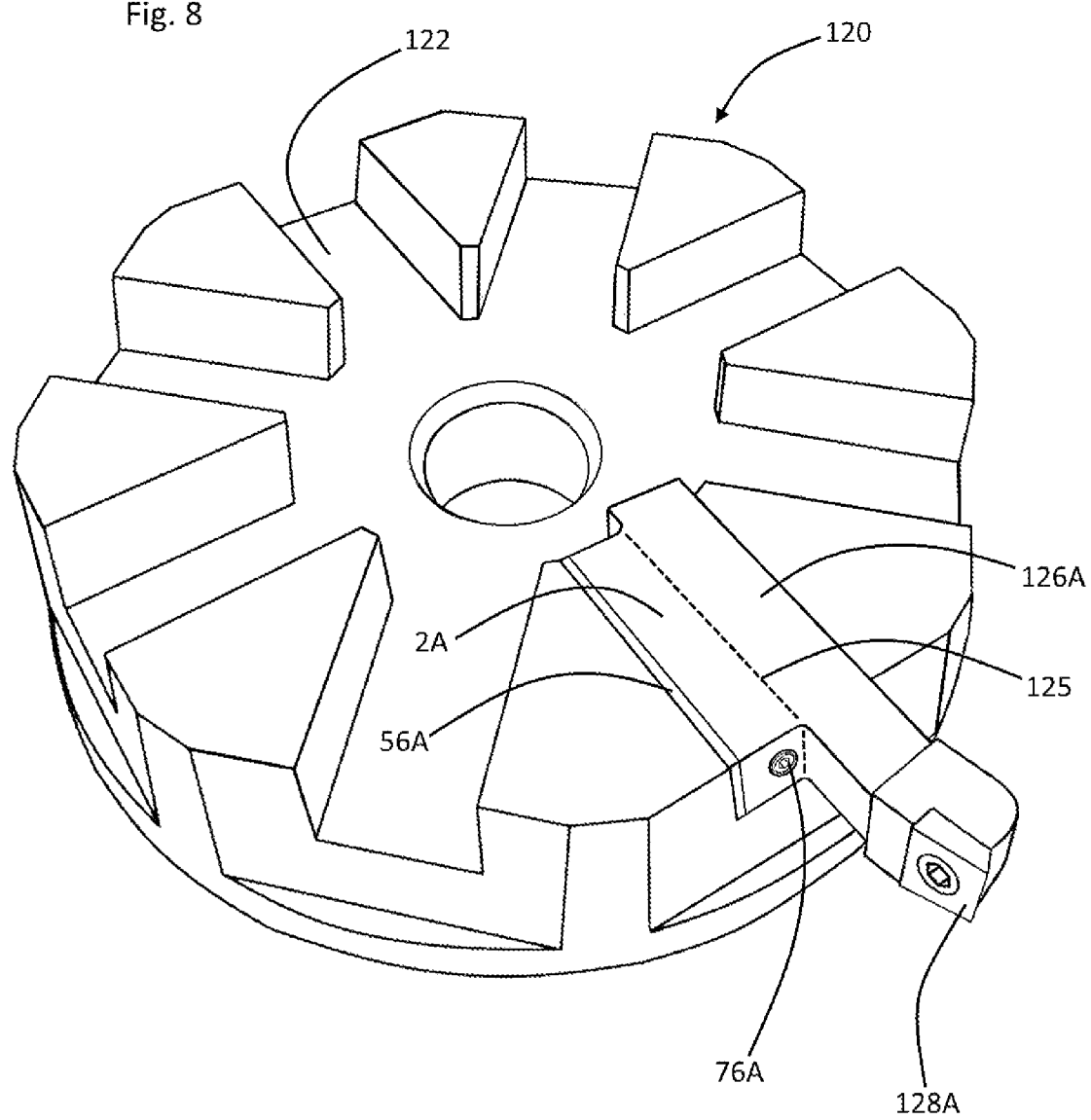

LATHE TOOL MOUNTING EXPANDER

FIELD OF THE INVENTION

This invention relates to metal working lathes. More particularly, this invention relates to such machines which incorporate a rotary lathe tool selector turret, and further relates to apparatus for securing lathe tools, lathe bits, or stick tools within such turrets.

BACKGROUND OF THE INVENTION

Apparatus utilized for holding a lathe stick tool within a mounting channel within a rotary lathe's tool selector turret are commonly mechanically cumbersome and inconvenient to utilize. Such apparatuses also commonly become fouled or jammed due to incursions of metal cuttings and other debris within and about their mechanical moving parts.

The instant invention solves or ameliorates the problems discussed above by providing a lathe tool mounting expander configured as a block which houses and deploys hydraulic rams which press against and hold the shank of a lathe stick tool within a selector turret channel.

BRIEF SUMMARY OF THE INVENTION

A major structural component of the instant inventive lathe tool mounting expander assembly comprises a block having a height, a depth, inner and outer ends, a base end, a compression end, and a compression face. Where the assembly's block component is intended for use within a tool mount channel within a metal working lathe's rotary selector turret, the height of the block is preferably substantially equal (less approximately $5/1000"$) to one-half of the width of such channel, the other half of such channel accommodating a commonly sized shank of a lathe stick tool. The depth dimension of such block component also is preferably substantially equal to the depth of such channel. In the preferred embodiment, the block component is composed of durable tool grade steel.

A further structural component of the instant inventive assembly comprises at least a first cylindrical void which extends into the block component. Preferably, such extension is is in the baseward direction from the block's compression face so that first cylindrical void opens at the block's compression end. For purposes of ease of milling fabrication of the block's first cylindrical void, such void preferably has a circular cross-sectional profile. Other cross-sectional profile configurations of the first cylindrical void such as the stadium geometric shape (i.e., rectangular with semi-circular ends) are considered to fall within the scope of the invention.

A further structural component of the instant inventive assembly comprises a second cylindrical void which, like the first cylindrical void, extends into the block. In the preferred embodiment, the second cylindrical void extends inwardly from the block's outer end and opens at the outer end. Also in the preferred embodiment, the second cylindrical void has a circular cross-sectional profile. For purposes of space economy within the block, the second circular void is preferably positioned beneath the floor of the first cylindrical void, and overlying the block's base end. Alternate positioning of the second cylindrical void outwardly from the first cylindrical void, or laterally therefrom are considered to fall within the scope of the invention.

Further structural components of the instant inventive assembly comprise first and second pistons which are respectively closely fitted to and are slidably mounted within the first and second cylindrical voids. In the preferred embodiment, sliding hydraulic pressure ring seals are disposed between such first and second pistons and their cylinders' walls.

A further structural component of the instant inventive assembly comprises a conduit extending between the first and second cylindrical voids for conveying hydraulic fluid initially stored within the second cylindrical void to the first cylindrical void. Where an inner end of the second cylindrical void underlies the floor of the first cylindrical void (as is preferred), the conduit suitably comprises a short port or passage drilled through the preferably steel matrix of the block to connect the two voids.

A further structural component of the instant inventive assembly comprises a jack screw actuator which is connected operatively to the block and to the second piston. In the preferred embodiment, the jack screw actuator comprises a piston shaft which extends outwardly from the second piston and along the second cylindrical void. Such shaft preferably presents male helical threads which engage female helical threads formed at the preferably circular cylindrical wall of the second cylindrical void. The outer end of the jack screw actuator is preferably exposed at the outer opening of the second cylindrical void, such outer end preferably presenting a wrench or driver engaging protuberance or void.

In operation of the instant inventive assembly, and assuming that the helical threads described above are right-handed, a machinist may place the block component side by side with the shank of a lathe stick tool within a tool mount channel of a lathe's rotary tool selector turret. Thereafter, the machinist may apply a wrench (for example an Allen wrench) to the jack screw actuator's exposed outer end, and the machinist may turn the wrench clockwise. Such clockwise motion screw drives the second piston inwardly against hydraulic fluid, driving the hydraulic fluid through the conduit, and simultaneously upwardly driving the first piston. Such upward first piston driving allows the block to function as an expander which securely compressively holds both itself and the lathe stick tool within the turret's channel.

Further preferred structural components of the instant inventive assembly comprise a plurality of third cylindrical voids, each such void preferably being configured substantially identically with the at least first cylindrical void. Where the at least first cylindrical void resides at the inner end of the block (as is preferred), the plurality of third cylindrical voids are preferably arranged in a linear series extending outwardly along the block's compression face. In a preferred embodiment, the third cylindrical voids are three in number, causing the inventive assembly to deploy a total of four tool compressing pistons. Fewer and greater numbers voids among the plurality of third cylindrical voids are considered to fall within the scope of the invention.

Where the inventive assembly comprises the preferred plurality of third cylindrical void's component, a matching plurality of third pistons are necessarily provided, such pistons preferably being configured substantially identically with the first piston. In order to accommodate the passage of the pressurized hydraulic fluid into the third cylindrical voids, fluid passage shunts are preferably formed at the base or floor ends of the third cylindrical voids, such shunts communicating the hydraulic fluid sequentially to the third cylindrical voids. To facilitate rotary milling formations of the shunts, the first and plurality of third cylindrical voids are preferably closely spaced along the block to define relatively narrow dividing walls. Such narrowing of the void dividing walls advantageously allows an undercutting "T" slot milling bit (preferably having a short head space equal to the desired height of the shunts, and having a throat and head radius differential slightly greater than one-half of the wall thicknesses) to be utilized in an automated milling fashion to form hourglass configured shunts.

In a preferred embodiment of the instant inventive assembly, the compression end of the block is specially configured to present an attachable and removable debris shield plate having a plurality of piston wiping ports which align with the at least first and preferably provided plurality of third cylindrical voids. In order to prevent incursions of cuttings and debris into the interior of the block, the wiping ports of such debris shield preferably present channel mounted "O" rings disposed between the ports' inner peripheries and the outer peripheries of the first and plurality of third pistons. In the preferred embodiment, the lower ends of such debris shield ports further function as piston ejection stops. To facilitate such ejection stopping function, coffered lands or shoulders extending annularly about the first and plurality of third pistons are preferably milled at the pistons' cylindrical walls, such shoulders preferably having outside diameters slightly greater than the inside diameters of the debris shield ports.

Accordingly, objects of the instant invention include the provision of a lathe tool mounting expander assembly which incorporates structures, as described above, and which arranges those structures in relation to each other in the manners described above for the performance of beneficial functions described above.

Other and further objects, benefits, and advantages of the instant invention will become known to those skilled in the art upon review of the Detailed Description which follows, and upon review of the appended drawings.

BRIEF DESCRIPTION OF THE DRAWINGS

FIG. 8 substantially redepicts the structure of FIG. 7, the view of FIG. 8 showing an alternate configuration of block and lathe stick tool components.

DETAILED DESCRIPTION OF PREFERRED EMBODIMENTS

Figure 1:
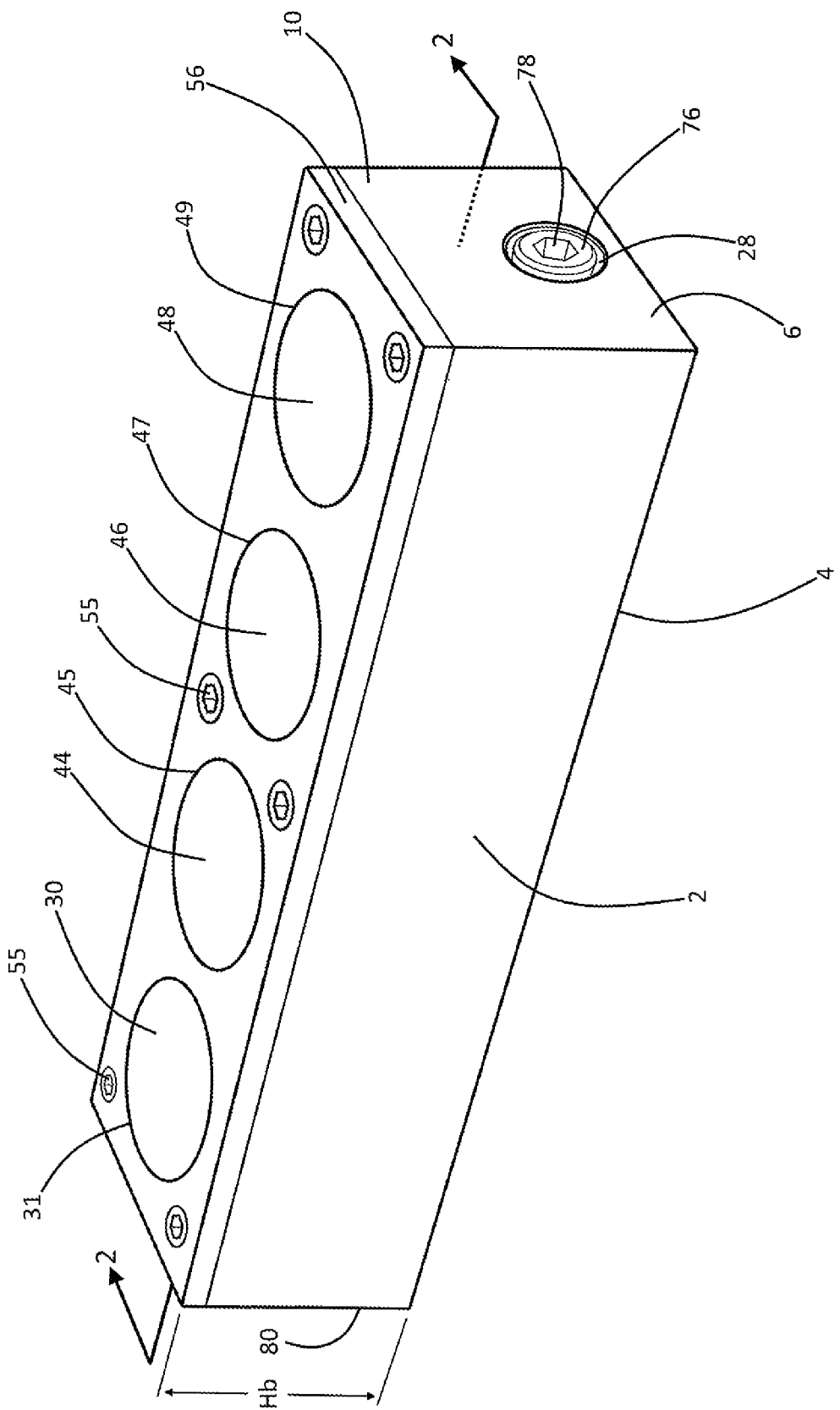
FIG. 1 is a perspective view of a preferred embodiment of the instant inventive lathe tool mounting expander assembly.

Referring now to the drawings, and in particular to Drawing FIG. 1, a block component of the instant inventive lathe tool mounting expander assembly is referred to generally by Reference Numeral 2. The block 2 has a base end 4, an outer end 6, an upper compression end 10, a compression face 8, and an inner end 80.

Referring simultaneously to FIGS. 1, 2, 4, and 5, a first cylindrical void 12 extends into the block 2, such void having a floor 98 at its base end 61. The first cylindrical void 12 preferably opens upwardly at the compression end 10 of the block 2.

Figure 2:
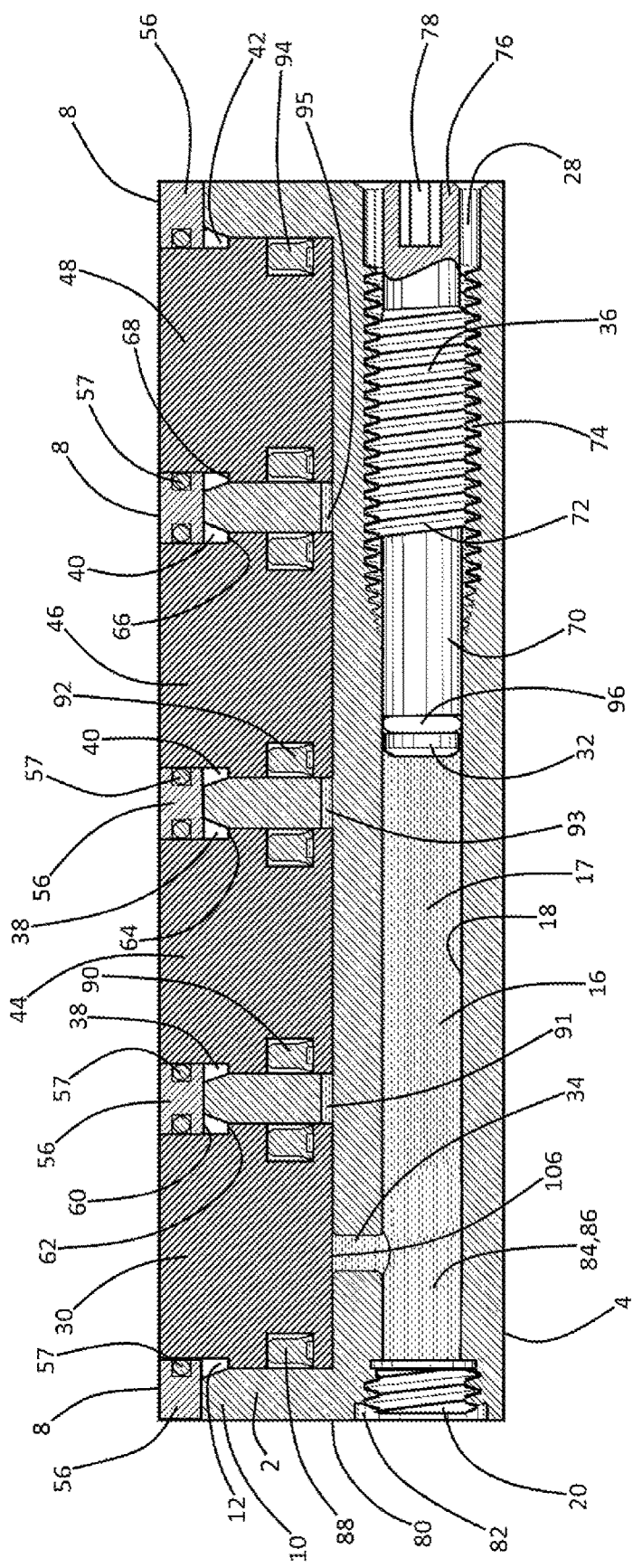
FIG. 2 is a sectional view as indicated in FIG. 1.

Referring simultaneously to FIGS. 1 and 2, a second cylindrical void 16 extends into the block 2, such void having an annular cylindrical wall 18, and having an inner end floor 20, preferably comprising a screw plug and washer combination 84, 86. In the preferred embodiment, the second cylindrical void 16 has an outer opening 28 at the block's outer end 6. The first and second pistons 30 and 32 are preferably respectively nestingly received within the first and second cylindrical voids 12 and 16 for slidable reciprocating motions therein.

A further structural component of the instant inventive assembly comprises a conduit for communication of pressurized hydraulic fluid 17 from the second cylindrical void 16 into the first cylindrical void 12. Such conduit suitably comprises a channel 34 which extends through the preferably steel matrix of the block 2 from the floor 98 of the first cylindrical void 12 to the wall 18 of the second cylindrical void 16.

Referring further simultaneously to FIGS. 1 and 2, the instant inventive assembly preferably further comprises a jack screw actuator 36 which is connected operatively to both the block 2 and the second piston 32. In the preferred embodiment, the jack screw actuator comprises a piston shaft 70 which is fixedly attached to and extends outwardly from piston 32, such shaft 70 presenting male helical threads 72. In the preferred embodiment, the outer end of the wall 18 of the second cylindrical void 16 is helically tap milled to correspondingly present female helical threads 74 for engagement with the male helical threads 72. The outer end 76 of shaft 70 preferably presents wrench or driver tool engaging turning means 78 which are preferably configured as a non-circular socket or void. Suitably, such turning means may be alternatively configured as a non-circular protuberance such as a hexhead (not depicted within views). In operation, clockwise turning of the jack screw actuator 36 drives the second piston 32 against the hydraulic fluid 17, driving such fluid through conduit 34 for simultaneous upward driving against piston 30 and movement of the piston from the retracted position depicted in FIG. 2 to the telescoped position depicted in FIG. 3.

Referring to FIG. 2, the annulus at opening 28 about shaft end 76, may advantageously be utilized for securing a fitted debris shielding cap (not depicted within views).

Figure 3:
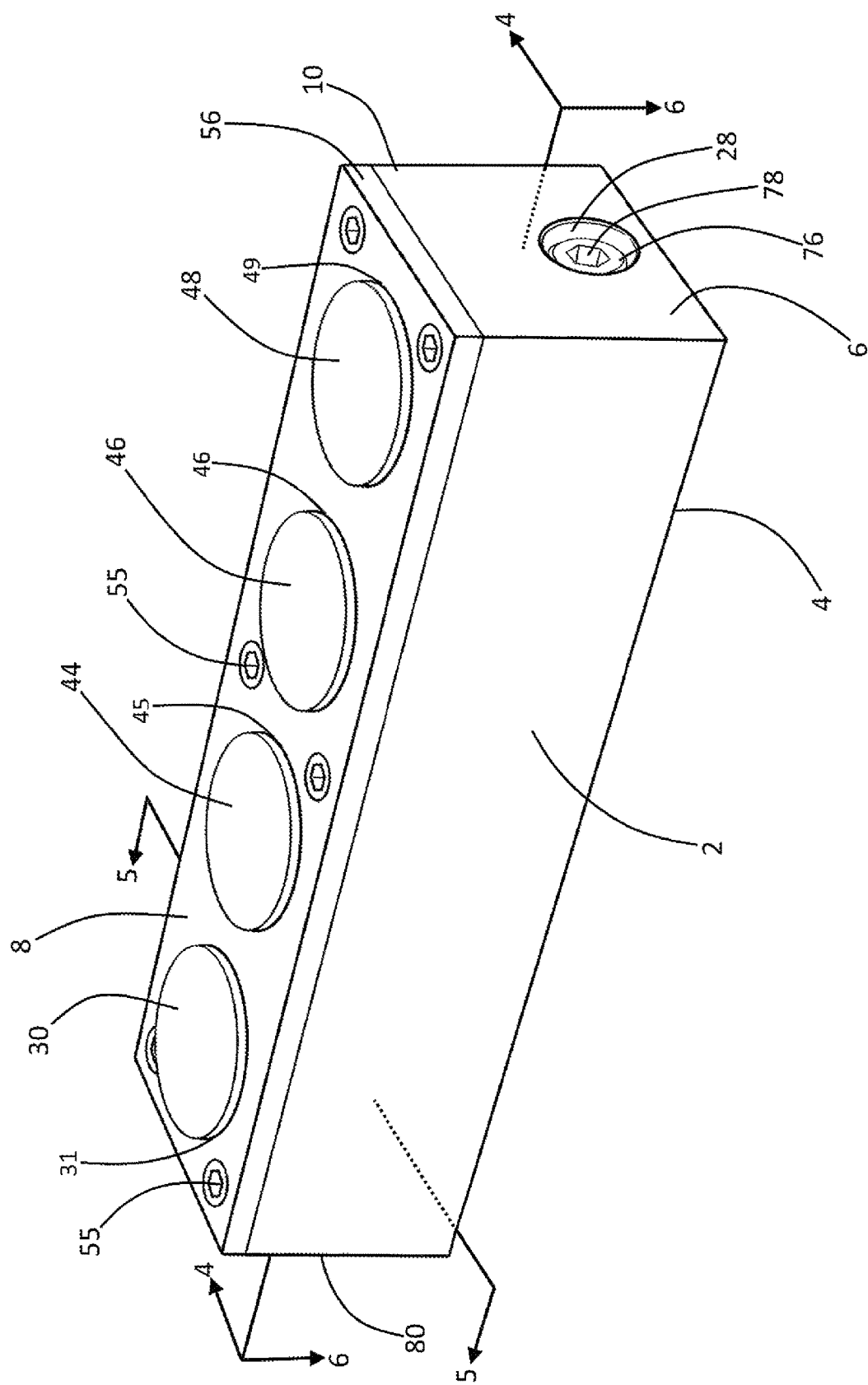
FIG. 3 redepicts the structure of FIG. 1, the view of FIG. 3 showing first and a plurality of third piston components in upwardly extended positions.
Figure 4:
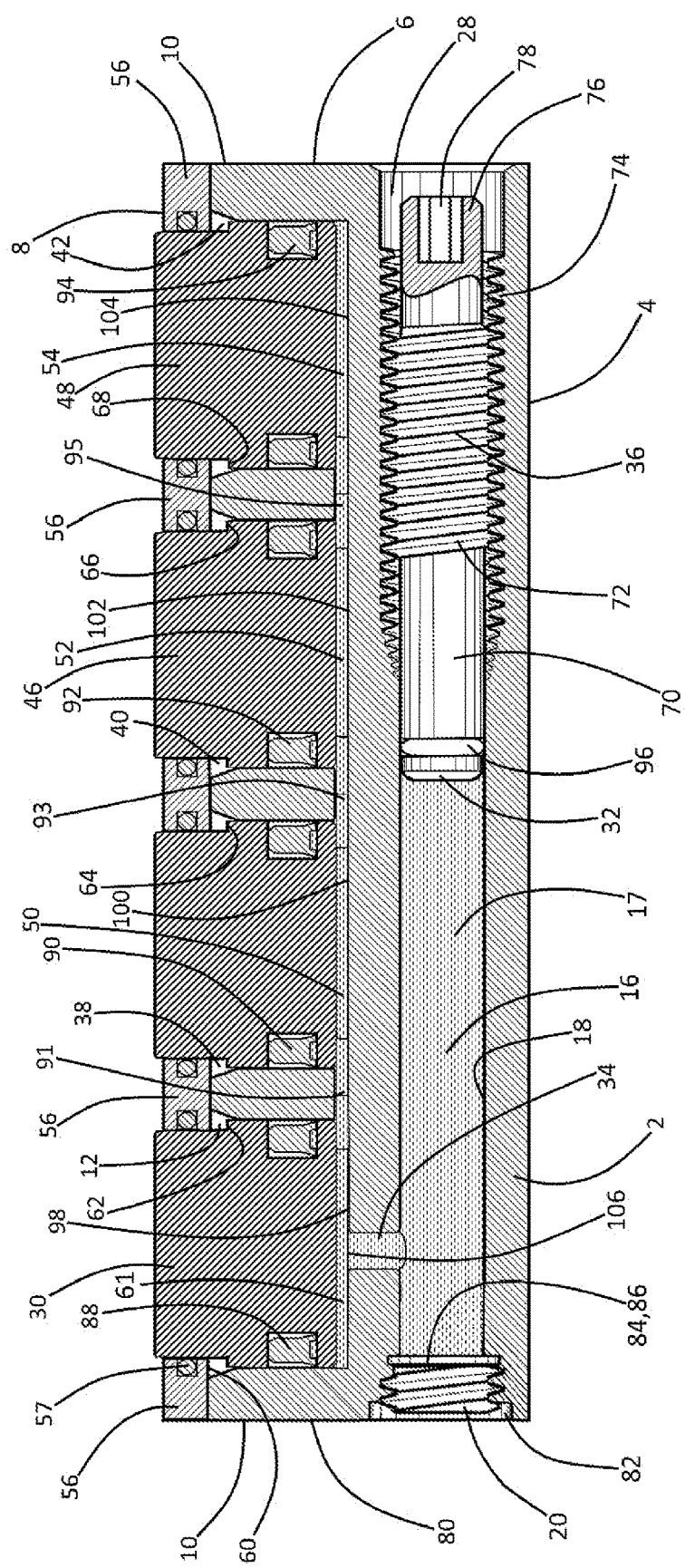
FIG. 4 is a sectional view as indicated in FIG. 3.
Figure 5:
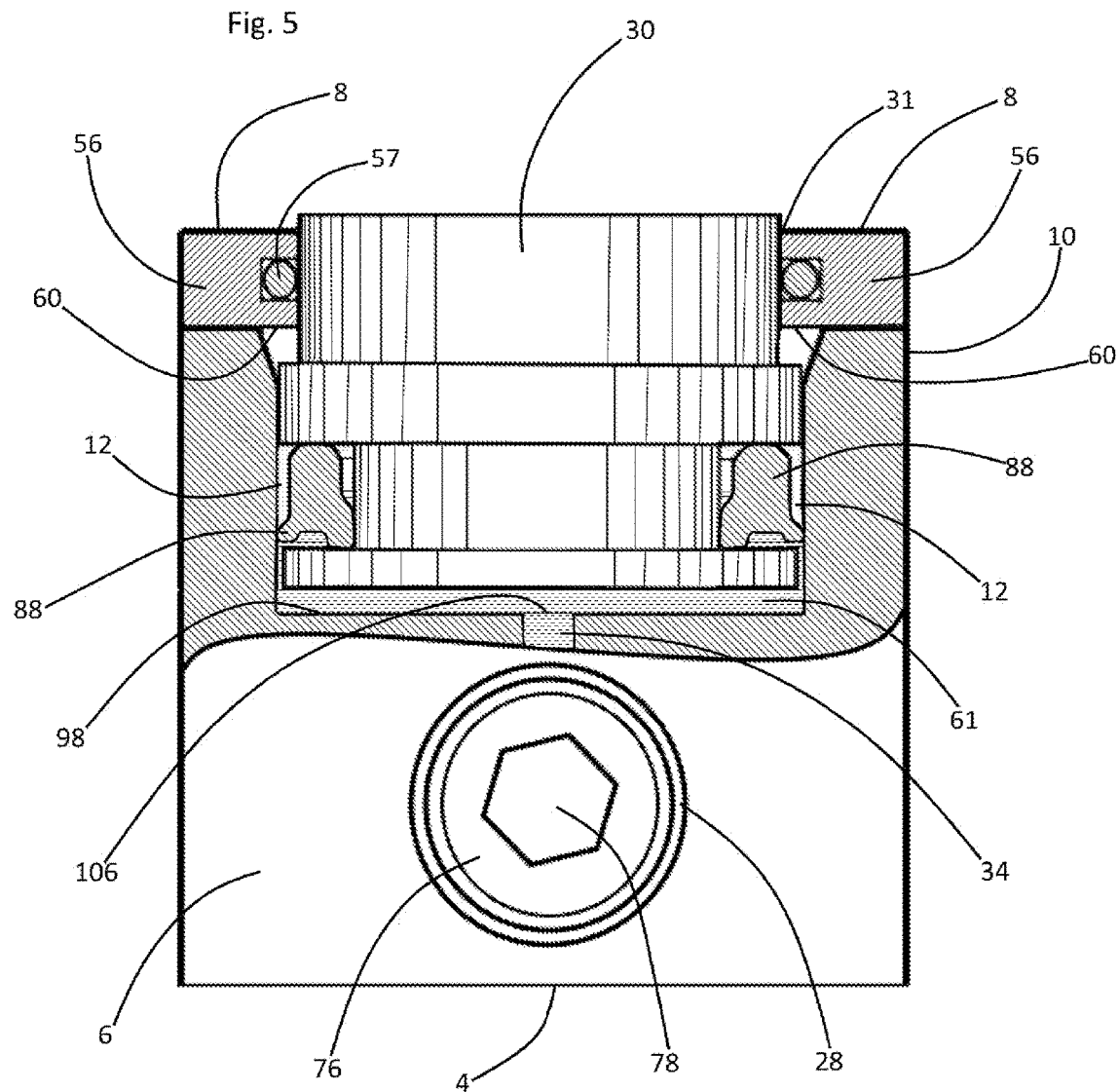
FIG. 5 is an alternative sectional view as indicated in FIG. 3.

Referring simultaneously to FIGS. 1-6, the instant inventive assembly preferably further comprises a plurality of third cylindrical voids 38, 40, and 42, which respectively slidably receive a plurality of third pistons 44, 46, and 48. Each of the third cylindrical voids 38, 40, and 42, is preferably configured substantially identically with the first cylindrical void 12, and each of the third pistons 44, 46, and 48, is similarly configured substantially identically with the first piston 30. Like the first cylindrical void 12, each of the third cylindrical voids 38, 40, and 42, preferably opens upwardly at the block's compression end 10. Referring further simultaneously to FIG. 4, to facilitate hydraulic fluid driving of the third pistons 44, 46, and 48, shunt channels are preferably milled into the block 2 in an undercutting fashion beneath the voids' three partitioning walls. Such undercutting milling may advantageously form hourglass shaped shunts 91, 93, and 95 which communicate fluid pressure and flow between adjacent pairs of pistons among the first and plurality of third pistons 30, 44, 46, and 48. In the preferred embodiment, such shunts 91, 93, and 95, are positioned at the base or lower ends 61, 50, 52, and 54, of the cylindrical voids 12, 38, 40, and 42. Preferably, the floors of shunts 91, 93, and 95 are co-extensive with the floors 98, 100, 102, and 104 of the first and plurality of third cylindrical voids 12, 38, 40, and 42.

Referring simultaneously to FIGS. 1-5, the compression end 10 of the block 2 is preferably specially configured to comprise a debris shield 56, such shield 56 having a series of circular piston wiping ports 31, 45, 47, and 49, arranged in overlying alignments with the upper openings of the first and plurality of third cylindrical voids 12, 38, 40, and 42. The debris shield 56 is removably mounted by means of screws 55, and each of such shield's ports 31, 45, 47, and 49, is preferably peripherally lined by a channel mounted dust and debris blocking "O" ring 57.

To prevent hydraulic fluid driven ejections of the pistons 30, 44, 46, and 48, slide stops are provided, such stops preferably being in the form of coffers or shoulders 62, 64, 66, and 68, which respectively extend annularly about pistons 30, 44, 46, and 48. The outside diameters of the shoulders 62, 64, 66, and 68, are preferably slightly greater than the inside diameters of ports 31, 45, 47, and 49, such diameter differentials allowing the upper faces of the shoulders to stop against the undersurface 60 of the debris shield 56.

Channel mounted hydraulic pressure sealing rings 88, 90, 92, and 94, preferably respectively extend annularly about pistons 30, 44, 46, and 48, and a similarly mounted hydraulic pressure sealing ring 96 extends about and seals the second piston 32.

Figure 6:
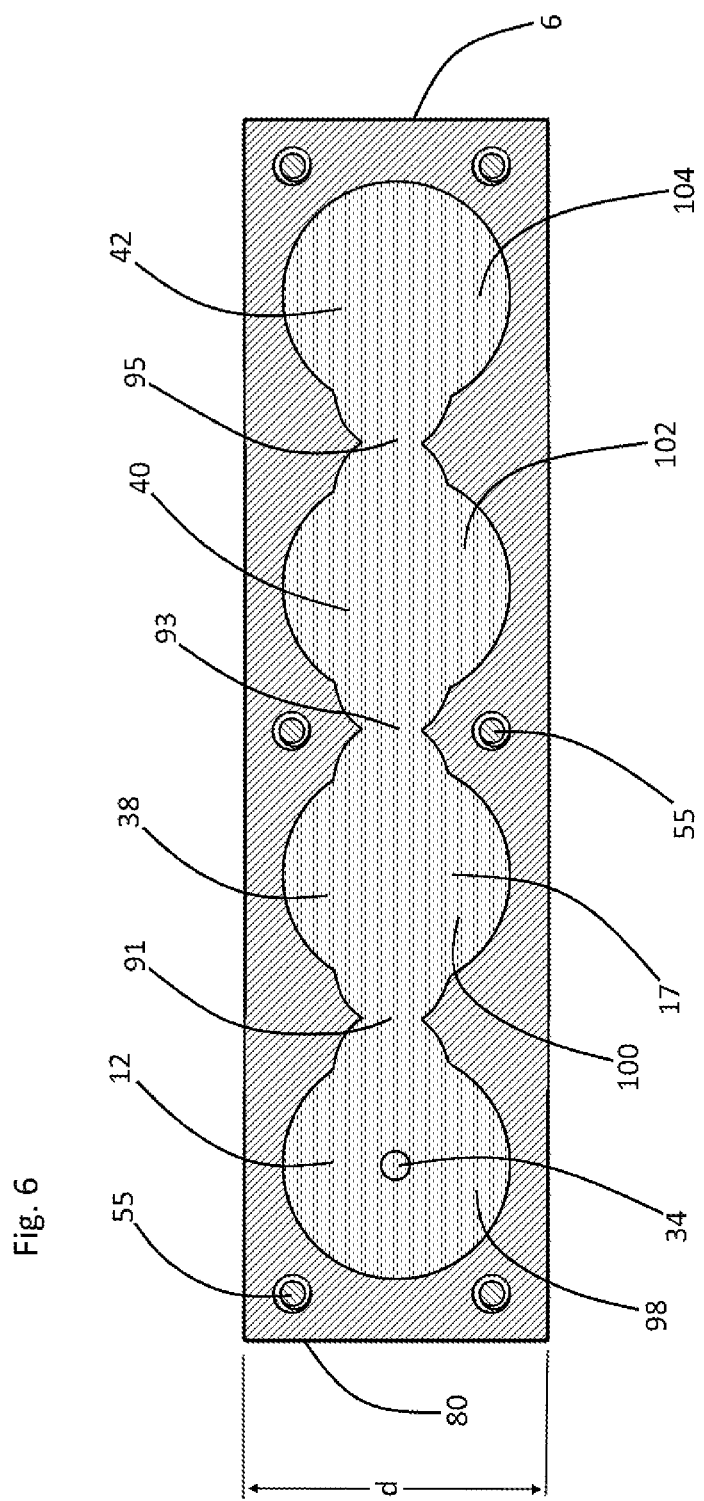
FIG. 6 is a further alternative sectional view as indicated in FIG. 3.
Figure 7:
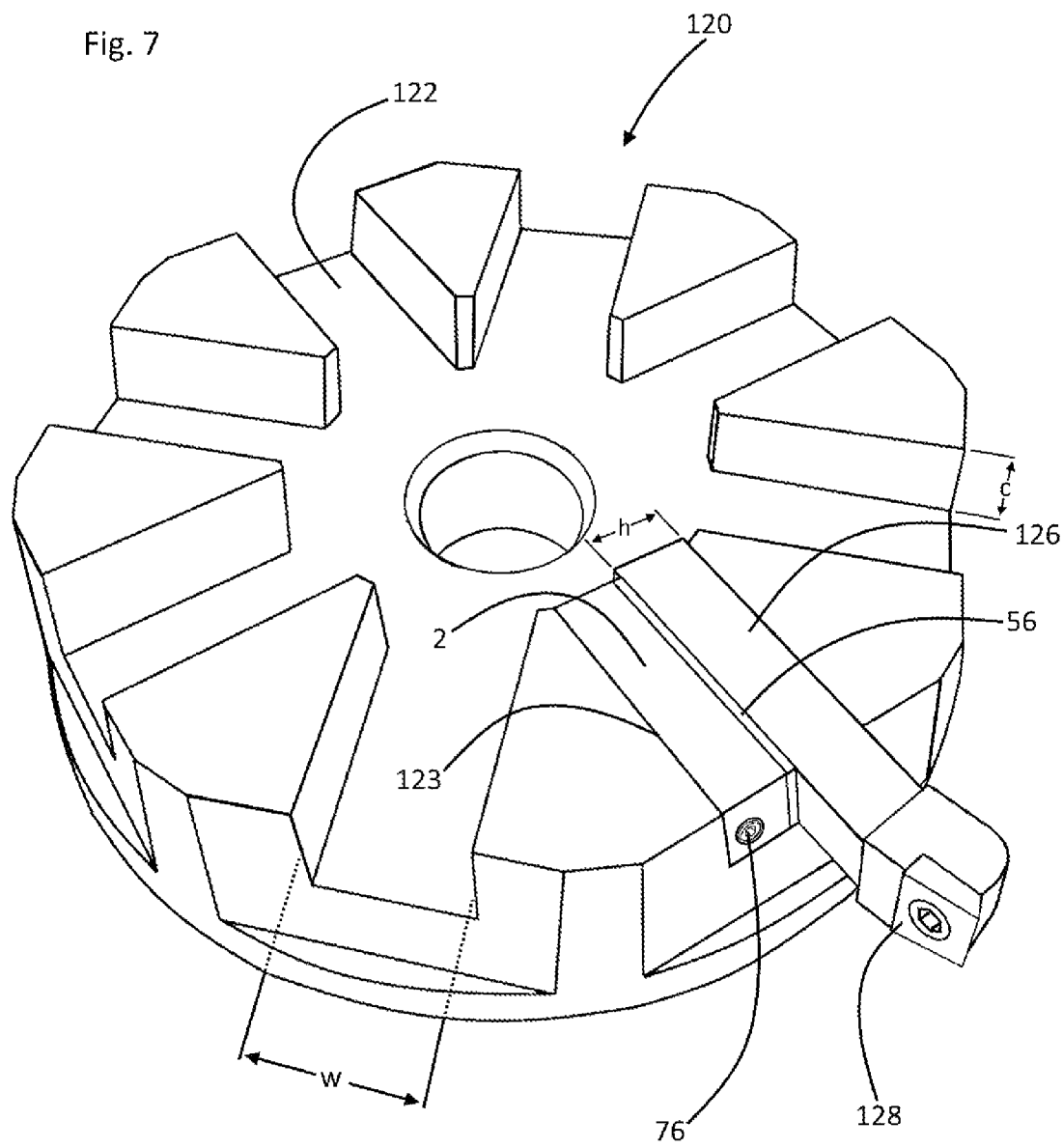
FIG. 7 redepicts the inventive assembly as including a lathe stick tool component and lathe's rotary tool selector turret component.

Referring simultaneously to FIGS. 1-7, a metal working lathe's rotary tool selector turret is referred to generally by Reference Arrow 120. Such turret 120 has a plurality of tool mounting channels 122, each such channel having a width "w" and having a depth "d", the height "Hb" of the block 2 and the height "h" of the shank 126 of a lathe stick tool 128 are preferably cumulatively slightly less (suitably between ⅝₀₀₀" and ½₀₀" less) than the channel width "w". Provided that the block 2 is initially configured at the FIG. 1 retracted position, such cooperating sizing of the block 2 and the stick tool shank 126 allows them to be slidably placed within one of the channels 122 in the side-by-side manner depicted in FIG. 7. Referring in particular to FIGS. 6 and 7, the depth "d" of the block 2 and the depth "c" of the channels 122 are preferably substantially equal so that neither of the lateral surfaces of the block 2 and the tool shank 126 protrude axially from the turret 120.

Upon loosely assembling structures as indicated in FIG. 7, a machinist may apply an Allen wrench to socket 78, and may turn the jack screw actuator 36 including screw threads 72 and shaft 70 clockwise. Such clockwise turning motion drives the second piston 32 and its hydraulic seal 96 inwardly against hydraulic fluid 17. The hydraulic fluid immediately ejects at ejection port 106 against the first piston 30, raising it and substantially simultaneously raising each of the third pistons 44, 46, and 48, by virtue of successive hydraulic fluid flows through shunts 91, 93, and 95.

Such machinist's application of the wrench at socket 76 simply and conveniently moves the first and plurality of third pistons from their retracted positions, as depicted in FIG. 1, toward their extended and telescoped positions depicted in FIG. 3. Prior to reaching their full extensions depicted in FIG. 3, the compression ends of pistons 30, 46, and 48, forcefully drive against a side wall of tool shank 126, and compressively drive against the turret 120 at a butt joint or abutting lands 123. Counter-clockwise turning of the jack screw actuator 36 relieves hydraulic fluid pressure and allows for easy removal and interchange of the stick tool 126, 128.

Referring simultaneously to FIGS. 7 and 8, each of the structures of FIG. 8 identified by a reference numeral having the suffix "A" are substantially identical to similarly numbered structures appearing in FIG. 7. In the FIG. 8 alternative, a wholly formed joint 125 is provided at a nexus between block 2A, and the alternatively permanently affixed stick tool 126A,128A.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope at least commensurate with the appended claims.

The invention hereby claimed is:

1. A lathe tool mounting expander assembly, said assembly being actuated by hydraulic fluid, said assembly comprising:
   (a) a block having a base, an inner end, an outer end, a compression end, and a compression face;
   (b) a first cylindrical void extending into the block, the first cylindrical void having a planar floor, said void opening at the block's compression end;
   (c) a second cylindrical void extending into the block, the second cylindrical void having a wall and a floor, said void opening at the block's outer end;
   (d) first and second pistons respectively slidably mounted within the first cylindrical void and the second cylindrical void;
   (e) a conduit extending between the first cylindrical void and the second cylindrical void, the conduit being adapted for conveying the hydraulic fluid from the second cylindrical void to the first cylindrical void;
   (f) a jack screw actuator connected operatively to the block, the jack screw actuator being adapted for driving the second piston against the hydraulic fluid, the hydraulic fluid, upon such piston driving, flowing through the conduit and moving the first piston; and
   (g) a plurality of third cylindrical voids and a plurality of third pistons, each void among the plurality of third cylindrical voids opening at the block's compression end and having a planar floor wherein the third pistons are respectively slidably received within the third cylindrical voids, wherein the conduit is adapted for further conveying the hydraulic fluid to the third cylindrical voids, wherein each cylindrical void among the first cylindrical void and the plurality of third cylindrical voids has a base end, wherein the conduit comprises a plurality of shunts having planar floors, wherein each shunt is hourglass shaped, wherein each shunt opens at the base ends of an adjacent pair of voids among the first cylindrical void and the plurality of third cylindrical voids, and wherein each planar floor among the first cylindrical void's planar floor, the third cylindrical voids' planar floors, and the shunts' planar floors is coplanar with each other planar floor among said planar floors.

2. The lathe tool mounting expander assembly of claim 1 wherein the second cylindrical void is positioned between the block's base and at least one floor among the first and third cylindrical voids' floors.

3. The lathe tool mounting expander assembly of claim 2 wherein the block's compression end comprises a removable debris shield.

4. The lathe tool mounting expander assembly of claim 3 wherein the block's removable debris shield has an undersurface positioned oppositely from the block's compression face, and wherein each piston among the first piston and the plurality of third pistons comprises a slide stop, each piston's slide stop being positioned for, upon a movement of said each piston away from the block's base, engaging said undersurface.

5. The lathe tool mounting expander assembly of claim 4 wherein each slide stop comprises a shoulder extending annularly about one of the pistons among the first piston and the plurality of third pistons.

6. The lathe tool mounting expander of claim 4 further comprising a plurality of O-rings, each O-ring being disposed between the removable debris shield and one of the pistons among the first piston and the plurality of third pistons.

7. The lathe tool mounting expander assembly of claim 3 wherein the jack screw actuator comprises a shaft fixedly attached to and extending outwardly from the second piston, the jack screw actuator further comprising a male and female helical threads combination whose threads respectively extend from said shaft and from the second cylindrical void's wall.

8. The lathe tool mounting expander assembly of claim 7 wherein the jack screw actuator's outwardly extending shaft has an outer end exposed at the block's outer end, and further comprising turning means connected operatively to said shaft outer end.

9. The lathe tool mounting expander assembly of claim 8 wherein the turning means comprise an outwardly opening non-circular void or comprise an outwardly extending non-circular protuberance.

10. The lathe tool mounting expander assembly of claim 1 wherein the second cylindrical void further opens at said inner end, and wherein the second cylindrical void's floor comprises a helically threaded plug.

11. The lathe tool mounting expander assembly of claim 1 further comprising a plurality of pressure seals, each seal among the plurality of pressure seals extending annularly about one of the pistons among the first piston, the second piston, and the plurality of third pistons.

12. The lathe tool mounting expander assembly of claim 1 wherein the conduit has a fluid injection end, said end opening at an innermost void among the first cylindrical void and the plurality of third cylindrical voids.

13. The lathe tool mounting expander assembly of claim 1 further comprising a tool and joint combination, said combination's tool comprising a machining implement selected from rotary lathe tool selector turrets and stick tools.

14. The lathe tool mounting expander assembly of claim 13 wherein the block has a height extending from its base to its compression face, and wherein the machining implement comprises one of the rotary lathe tool selector turrets, said one of the turrets having a plurality of tool mount channels, each tool mount channel among said plurality of channels having a width greater than the block's height.

15. The lathe tool mounting expander assembly of claim 14 further comprising a lathe stick tool having a height, the combined heights of the lathe stick tool and the block being less than said each tool mount channel's width.

16. The lathe tool mounting expander assembly of claim 15 wherein each piston among the first piston and the plurality of third pistons is adapted for alternatively telescoping and retracting respectively toward tool compressing and tool releasing positions, each such piston having a height extension upon movement toward its tool compressing position, the combined heights of the lathe stick tool, the block, and one of the pistons' height extensions being, upon movement of the one of the pistons to its tool compressing position within said each tool mount channel, equal to a width of a respective tool mount channel which nestingly receives the lathe stick tool and the block.

17. The lathe tool mounting expander assembly of claim 16 wherein said each tool mount channel has a depth, wherein the block has a depth, and wherein said depths are substantially equal to each other.

\* \* \* \* \*